US009710769B2

(12) United States Patent
Karanam et al.

(10) Patent No.: US 9,710,769 B2
(45) Date of Patent: Jul. 18, 2017

(54) METHODS AND SYSTEMS FOR CROWDSOURCING A TASK

(71) Applicant: Xerox Corporation, Norwalk, CT (US)

(72) Inventors: Saraschandra Karanam, Bangalore (IN); Chithralekha Balamurugan, Pondicherry (IN); Neha Gupta, Tamilnadu (IN); Nischal Murthy Piratla, Freemont, CA (US)

(73) Assignee: Conduent Business Services, LLC, Dallas, TX (US)

( * ) Notice: Subject to any disclaimer, the term of this patent is extended or adjusted under 35 U.S.C. 154(b) by 602 days.

(21) Appl. No.: 14/231,773

(22) Filed: Apr. 1, 2014

(65) Prior Publication Data

US 2015/0278747 A1  Oct. 1, 2015

(51) Int. Cl.
*G06K 9/00* (2006.01)
*G06Q 10/06* (2012.01)
*G06Q 50/00* (2012.01)

(52) U.S. Cl.
CPC ..... *G06Q 10/063112* (2013.01); *G06Q 50/01* (2013.01)

(58) Field of Classification Search
None
See application file for complete search history.

(56) References Cited

U.S. PATENT DOCUMENTS

| 5,822,742 | A  | * | 10/1998 | Alkon | G06K 9/4628 382/159 |
| 6,138,087 | A  | * | 10/2000 | Budzinski | G06F 17/27 704/9 |
| 2007/0128899 | A1 | * | 6/2007 | Mayer | G06F 9/4406 439/152 |
| 2015/0278747 | A1 | * | 10/2015 | Karanam | G06Q 50/01 705/7.14 |
| 2016/0379048 | A1 | * | 12/2016 | Kumar | G06K 9/00409 382/159 |

(Continued)

OTHER PUBLICATIONS

Chandler, D., & Kapelner, A. (2013). Breaking monotony with meaning: Motivation in crowdsourcing markets. *Journal of Economic Behavior & Organization.*

(Continued)

*Primary Examiner* — Iman K Kholdebarin
(74) *Attorney, Agent, or Firm* — Jones Robb PLLC

(57) ABSTRACT

The disclosed embodiments illustrate methods and systems for crowdsourcing a task. The method includes extracting one or more components from at least one task based on a task category associated with the at least one task. Each component corresponds to a part of the at least one task, that requires an input from a crowdworker. Further, the one or more components are categorized in a set of first categories, each of which includes similar components, and a second category that includes dissimilar components. The categorization is based on a comparison between content of each of component, and the task category. Thereafter, a representative component from at least one category from the set of first categories, and at least one component from the second category are combined to create the task. The task, so created, is crowdsourced to one or more crowdworkers.

5 Claims, 5 Drawing Sheets

(56) References Cited

U.S. PATENT DOCUMENTS

2017/0004374 A1* 1/2017 Osindero ............... G06T 1/20

OTHER PUBLICATIONS

Aaron D. Shaw,John J. Horton,Daniel L. Chen (2011) Designing Incentives for Inexpert Human Raters. In *Proceedings of the 2011 ACM Conference on Computer Supported Cooperative Work (CSCW2011)*.

Mason, W., Watts, D, J., (2009) Financial incentives and the 'Performance of Crowds', In *Proceedings of the 2009 HCOMP Conference*.

Kittur, A., Nickerson, J.V., Bernstein, M.S., Gerber, E., Shaw, A.D., Zimmerman, J., Lease, M., Horton, J. (2013): The future of crowd work. ; In *Proceedings of ACM Conference on Computer Supported Cooperative Work (CSCW 2013)*, 1301-131.

Rogstadius, J., Kostakos, V., Kittur, A., Smus, B., Laredo, J., & Vukovic, M. (May 2011). An Assessment of Intrinsic and Extrinsic Motivation on Task Performance in Crowdsourcing Markets. In ICWSM.

* cited by examiner

METHODS AND SYSTEMS FOR CROWDSOURCING A TASK

TECHNICAL FIELD

The presently disclosed embodiments are related, in general, to crowdsourcing. More particularly, the presently disclosed embodiments are related to methods and systems for crowdsourcing a task.

BACKGROUND

With the advancements in communication technology and the widespread penetration of the internet, various enterprises and individuals (hereinafter collectively referred to as requestors) are seeking collaborative solutions to their tasks from loosely bound groups of workers through the internet. The requestors may post the tasks on various online portals (hereinafter referred to as crowdsourcing platforms), which act as mediators between the requestors and the workers. The workers, in turn may fetch the tasks from the crowdsourcing platforms and thereafter post responses for the tasks on the crowdsourcing platforms.

Most of the tasks posted on such crowdsourcing platforms may be monotonous in nature. For example, a form digitization task requires repetitive manually entries from the workers for a set of fields in an electronic document. The monotonous nature of such tasks may lead to a reduction in the efficiency of the workers.

SUMMARY

According to embodiments illustrated herein, there is provided a method for crowdsourcing a task. The method includes extracting, by one or more processors, one or more components from at least one task based on a task category associated with the at least one task. Each of the one or more components corresponds to a part of the at least one task, that requires an input from a crowdworker. Thereafter, the one or more components are categorized by the one or more processors in a set of first categories and a second category, based on a comparison between content of each of the one or more components, and the task category. Each category in the set of first categories includes similar components from the one or more components. Further, the second category includes dissimilar components from the one or more components. Finally, a representative component from at least one category from the set of first categories, and at least one component from the second category are combined by the one or more processors to create the task. The task, so created, is crowdsourced to one or more crowdworkers.

According to embodiments illustrated herein, there is provided a system for crowdsourcing a task. The system includes one or more processors that are operable to extract one or more components from at least one task based on a task category associated with the at least one task. Each of the one or more components corresponds to a part of the at least one task, that requires an input from a crowdworker. Thereafter, the one or more components are categorized in a set of first categories and a second category, based on a comparison between content of each of the one or more components, and the task category. Each category in the set of first categories includes similar components from the one or more components. Further, the second category includes dissimilar components from the one or more components. Finally, a representative component from at least one category from the set of first categories, and at least one component from the second category are combined to create the task. The task, so created, is crowdsourced to one or more crowdworkers.

According to embodiments illustrated herein, there is provided a computer program product for use with a computing device. The computer program product comprises a non-transitory computer readable medium, the non-transitory computer readable medium stores a computer program code for crowdsourcing a task. The computer readable program code is executable by one or more processors in the computing device to extract one or more components from at least one task based on a task category associated with the at least one task. Each of the one or more components corresponds to a part of the at least one task, that requires an input from a crowdworker. Thereafter, the one or more components are categorized in a set of first categories and a second category, based on a comparison between content of each of the one or more components, and the task category. Each category in the set of first categories includes similar components from the one or more components. Further, the second category includes dissimilar components from the one or more components. Finally, a representative component from at least one category from the set of first categories, and at least one component from the second category are combined to create the task. The task, so created, is crowdsourced to one or more crowdworkers.

According to embodiments illustrated herein, there is provided a method for digitizing a document. The method includes determining, by one or more processors, one or more portions comprising at least a handwritten text from an electronic document generated by scanning the document. Further, the one or more processors compare the one or more portions with each other to identify similar portions from the one or more portions, and dissimilar portions from the one or more portions, wherein the similar portions include at least the same handwritten text. Thereafter, the one or more processors combine a representative portion from at least one category from the set of first categories, and at least one portion from the second category to create a task. The task, so created, is crowdsourced to one or more crowdworkers for identification of the handwritten text in the electronic document.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
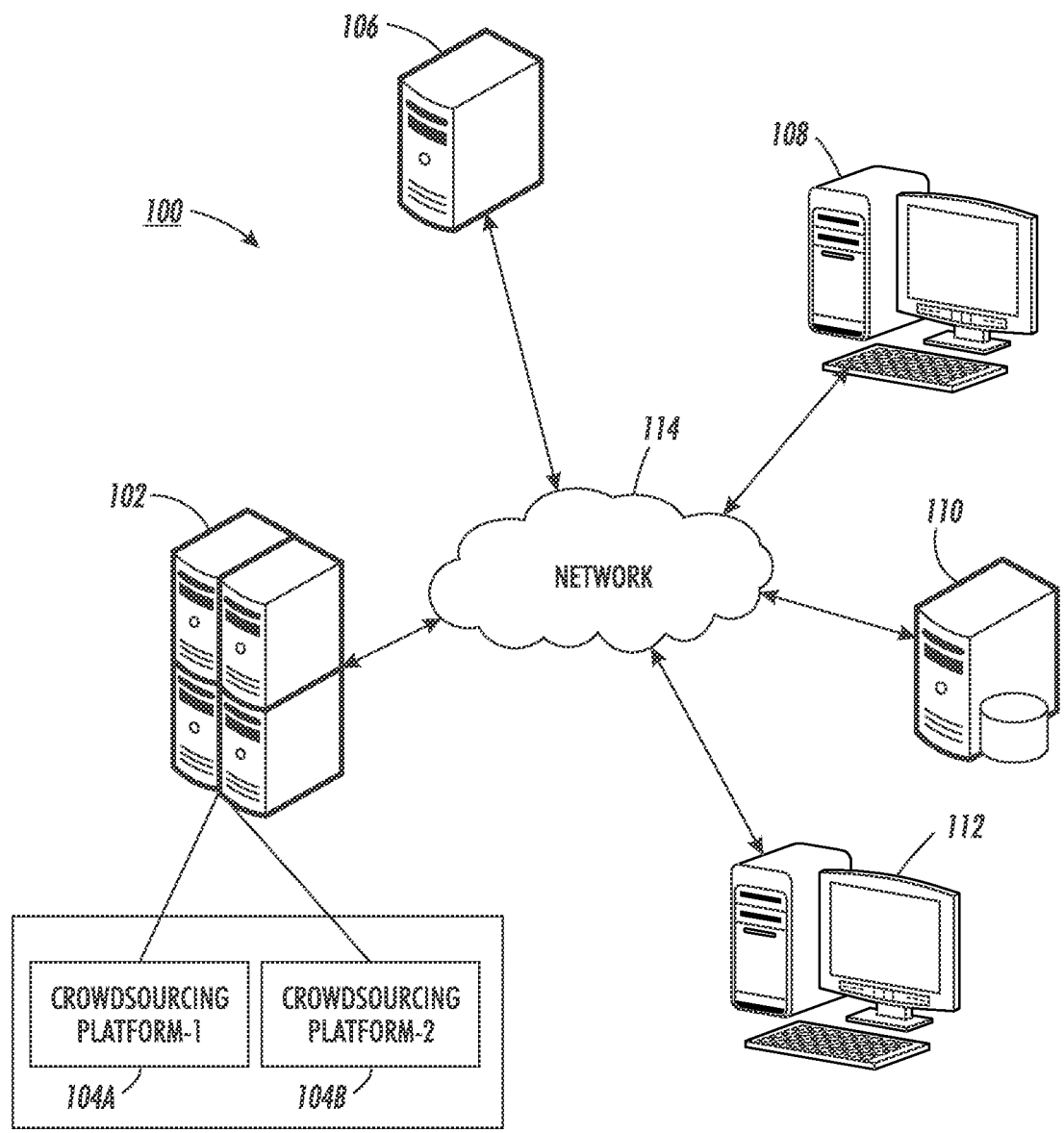
FIG. 1 is a block diagram of a system environment in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

DEFINITIONS

The following terms shall have, for the purposes of this application, the meanings set forth below.

A "task" refers to a piece of work, an activity, an action, a job, an instruction, or an assignment to be performed. Tasks may necessitate the involvement of one or more workers. Examples of tasks include, but are not limited to, digitizing a document, generating a report, evaluating a document, conducting a survey, writing a code, extracting data, translating text, and the like.

"Crowdsourcing" refers to distributing tasks by soliciting the participation of loosely defined groups of individual crowdworkers. A group of crowdworkers may include, for example, individuals responding to a solicitation posted on a certain website such as, but not limited to, Amazon Mechanical Turk and Crowd Flower.

A "crowdsourcing platform" refers to a business application, wherein a broad, loosely defined external group of people, communities, or organizations provide solutions as outputs for any specific business processes received by the application as inputs. In an embodiment, the business application may be hosted online on a web portal (e.g., crowdsourcing platform servers). Examples of the crowdsourcing platforms include, but are not limited to, Amazon Mechanical Turk or Crowd Flower.

A "crowdworker" refers to a workforce/worker(s) that may perform one or more tasks, which generate data that contributes to a defined result. According to the present disclosure, the crowdworker(s) includes, but is not limited to, a satellite center employee, a rural business process outsourcing (BPO) firm employee, a home-based employee, or an internet-based employee. Hereinafter, the terms "crowdworker", "worker", "remote worker", "crowdsourced workforce", and "crowd" may be interchangeably used.

A "task category" refers to a type of the task. In an embodiment, the task category of the task may be determined by analyzing one or more instructions to perform the task, which are included in the task. For example, if the task contains an instruction "Digitize the following images", the task category of the task may be determined as "Image Digitization". Examples of the task category may include, but are not limited to, image/video/text labeling/tagging/categorization, language translation, data entry, handwriting recognition, product description writing, product review writing, essay writing, address look-up, website look-up, hyperlink testing, survey completion, consumer feedback, identifying/removing vulgar/illegal content, duplicate checking, problem solving, user testing, video/audio transcription, targeted photography (e.g., of product placement), text/image analysis, directory compilation, or information search/retrieval.

A "component of a task" refers to a portion of the task, which may be determined based on the task category. In an embodiment, the component may correspond to an indivisible portion of the task such that a distinct input is required from a crowdworker for each component in the task. Examples of the distinct input may include, but are not limited to, a single selection (e.g., a mouse-click on a check-box), a single character (e.g., an alpha-numeral), a single word, a single phrase, or a single sentence. The term 'component' is hereinafter interchangeably referred as a 'unit', a 'part', or a 'portion'.

A "representative component" refers to a component of a task, selected from a category containing similar components of the task, to represent the components of that category. For example, a category-1 includes three similar components C1, C2, and C3 with the same value, for instance "01". In this case, any component, say the component C1, may be randomly selected as the representative component for the category-1. Thus, in an embodiment, a randomly selected component (e.g., the component C1) from a category of components (i.e., the category-1), may be representative of all the components (i.e., the components C1, C2, and C3) of that category (i.e., the category-1), where the components included in the category are similar to each other.

An "electronic document" or "digital image" or "scanned document" refers to information recorded in a manner that requires a computing device or any other electronic device to display, interpret, and process it. Electronic documents are intended to be used either in an electronic form or as printed output. In an embodiment, the electronic document includes one or more of text (handwritten or typed), image, symbols, and so forth. In an embodiment, the electronic document is obtained by scanning a document using a suitable scanner, a multi-function device, a camera or a camera-enabled device including but not limited to a mobile phone, a tablet computer, desktop computer or a laptop. In an embodiment, the scanned document is a digital image. The digital image refers to a collection of data, including image data in any format, retained in an electronic form. The digital image may contain one or more pictorials, symbols, text, line art, blank or non-printed regions, etc. The digital image may be stored in various file formats, such as, JPG or JPEG, GIF, TIFF, PNG, BMP, RAW, PSD, PSP, PDF, and the like. Hereinafter, the terms "electronic document", "scanned document", "image", and "digital image" are interchangeably used without departing from the scope of the ongoing description.

"Scanning" refers to a technique of recording an image as digital data in any format, thereby creating an electronic document.

"Remuneration" refers to rewards received by the one or more crowdworkers for attempting/submitting the one or more tasks. In an embodiment, the remuneration is a monetary compensation received by the one or more crowdworkers. However, a person having ordinary skills in the art would understand that the scope of the disclosure is not limited to remunerating the one or more crowdworkers with monetary compensation. In an embodiment, various other means of remunerating the one or more crowdworkers may be employed such as, remunerating the owners with lottery tickets, giving gift items, shopping vouchers, and discount coupons. In another embodiment, the remuneration may further correspond to strengthening of the relationship between the one or more crowdworkers and the crowdsourcing platform. For example, the crowdsourcing platform may provide the crowdworker with an access to more tasks so that the crowdworker may gain more. In addition, the crowdsourcing platform may improve the reputation score of the crowdworker so that more tasks are assigned to the crowdworker. A person skilled in the art would understand that combination of any of the above-mentioned means of remuneration could be used for remunerating the one or more crowdworkers. Further, the term "bonus remuneration" refers to an extra remuneration received by the one or more crowdworkers, in addition to the standard remuneration received for attempting/submitting the one or more tasks.

A "semi-automatic technique" refers to a method of performing one or more functions/steps/processes on a computing device with a human intervention/input. For example, a computing device may determine a task category associated with a task semi-automatically. To that end, the computing device may automatically determine an initial task category of the task and thereafter prompt an input from the requestor of the task to validate the initial task category. Based on the input received from the requestor, the computing device may determine a final task category for the task, which may or may not be the same as the initial task category.

FIG. 1 is a block diagram of a system environment 100, in which various embodiments can be implemented. The system environment 100 includes a crowdsourcing platform server 102, an application server 106, a requestor-computing device 108, a database server 110, a crowdworker-computing device 112, and a network 114.

In an embodiment, the crowdsourcing platform server 102 is operable to host one or more crowdsourcing platforms (e.g., a crowdsourcing platform-1 104*a* and a crowdsourcing platform-2 104*b*). One or more crowdworkers are registered with the one or more crowdsourcing platforms. Further, the crowdsourcing platform (such as the crowdsourcing platform-1 104*a* or the crowdsourcing platform-2 104*b*) may crowdsource one or more tasks by offering the one or more tasks to the one or more crowdworkers. In an embodiment, the crowdsourcing platform (e.g., 104*a*) presents a user interface to the one or more crowdworkers through a web-based interface or a client application. The one or more crowdworkers may access the one or more tasks through the web-based interface or the client application. Further, the one or more crowdworkers may submit a response to the crowdsourcing platform (i.e., 104*a*) through the user interface.

A person skilled in the art would understand that though FIG. 1 illustrates the crowdsourcing platform server 102 as hosting only two crowdsourcing platforms (i.e., the crowdsourcing platform-1 104*a* and the crowdsourcing platform-2 104*b*), the crowdsourcing platform server 102 may host more than two crowdsourcing platforms without departing from the spirit of the disclosure.

In an embodiment, the crowdsourcing platform server 102 may be realized through an application server such as, but not limited to, a Java application server, a .NET framework, and a Base4 application server.

In an embodiment, the application server 106 is operable to generate a task for crowdsourcing from at least one task received from the requestor-computing device 108. To that end, in an embodiment, the application server 106 extracts one or more components from the at least one task based on a task category associated with the at least one task. Each extracted component corresponds to a part of the at least one task, that requires an input from a crowdworker. Thereafter, the application server 106 categorizes the one or more components in a set of first categories, each of which includes similar components, and a second category that includes dissimilar components from the one or more components. The categorization of the one or more components is based on a comparison between content of each of the one or more components, and the task category. Further, the application server 106 combines a representative component from at least one category from the first set of categories, and at least one component from the second category to create the task. Thereafter, the application server 106 crowdsources the task, so created, by uploading the task on the crowdsourcing platform (e.g., 104*a*). The crowdsourcing platform (i.e., 104*a*) then offers the task to the one or more crowdworkers. Upon receiving responses for the crowdsourced task from the one or more crowdworkers, the crowdsourcing platform (i.e., 104*a*) forwards the received responses to the application server 106. The application server 106 may in-turn forward the received responses to the requestor-computing device 108. Further, in an embodiment, the application server 106 may validate the received responses by determining whether each response includes the input for the representative component. If it is determined that a response includes the input for the representative component, in an embodiment, the application server 106 may determine a count of components that correspond to the representative component in the at least one category. The application server 106 may reciprocate the response received for the representative component to the components that correspond to the representative component. Prior to reciprocating, the application server 106 may determine whether the response received for the representative component is correct. Further, in an embodiment, the one or more crowdworkers may receive a bonus remuneration, (in addition to a predetermined remuneration corresponding to the task) based on the validation of the responses and the count of the components in the at least one category. In an embodiment, the crowdsourcing platform (e.g., 104*a*) is operable to credit such bonus remuneration to the one or more crowdworkers. The method for crowdsourcing the task has been further explained with reference to FIG. 3. A method for digitizing a document using a similar crowdsourcing technique has been explained with reference to FIG. 4.

Some examples of the application server 106 may include, but are not limited to, a Java application server, a .NET framework, and a Base4 application server.

A person with ordinary skill in the art would understand that the scope of the disclosure is not limited to illustrating the application server 106 as a separate entity. In an embodiment, the functionality of the application server 106 may be implementable on/integrated with the crowdsourcing platform server 102.

The requestor-computing device 108 is a computing device used by a requestor to send the at least one task to the application server 106. The application server 106 may generate the task for crowdsourcing from the at least one task. As explained, the task may be crowdsourced by the application server 106 to the one or more crowdworkers through the crowdsourcing platform (e.g., 104a). Further, the requestor-computing device 108 may receive the responses for the task from the one or more crowdworkers through the crowdsourcing platform (i.e., 104a), via the application server 106. Examples of the requestor-computing device 108 include, but are not limited to, a personal computer, a laptop, a personal digital assistant (PDA), a mobile device, a tablet, or any other computing device.

In an embodiment, the database server 110 is operable to store the at least one task, the one or more components extracted from the at least one task, information pertaining to the categorization of the one or more components, and the generated task. In an embodiment, the database server 110 may receive a query from the crowdsourcing platform server 102 and/or the application server 106 to extract at least one of the at least one task, the one or more components extracted from the at least one task, the information pertaining to the categorization of the one or more components, or the generated task from the database server 110. The database server 110 may be realized through various technologies such as, but not limited to, Microsoft® SQL server, Oracle, and My SQL. In an embodiment, the crowdsourcing platform server 102 and/or the application server 106 may connect to the database server 110 using one or more protocols such as, but not limited to, Open Database Connectivity (ODBC) protocol and Java Database Connectivity (JDBC) protocol.

A person with ordinary skill in the art would understand that the scope of the disclosure is not limited to the database server 110 as a separate entity. In an embodiment, the functionalities of the database server 110 can be integrated into the crowdsourcing platform server 102 and/or the application server 106.

The crowdworker-computing device 112 is a computing device used by a crowdworker. The crowdworker-computing device 112 is operable to present the user interface (received from the crowdsourcing platform, e.g., 104a) to the crowdworker. The crowdworker receives the one or more crowdsourced tasks from the crowdsourcing platform (i.e., 104a) through the user interface. Thereafter, the crowdworker submits the responses for the crowdsourced tasks through the user interface to the crowdsourcing platform (i.e., 104a). Examples of the crowdworker-computing device 112 include, but are not limited to, a personal computer, a laptop, a personal digital assistant (PDA), a mobile device, a tablet, or any other computing device.

The network 114 corresponds to a medium through which content and messages flow between various devices of the system environment 100 (e.g., the crowdsourcing platform server 102, the application server 106, the requestor-computing device 108, the database server 110, and the crowdworker-computing device 112). Examples of the network 114 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 114 in accordance with various wired and wireless communication protocols such as Transmission Control Protocol and Internet Protocol (TCP/IP), User Datagram Protocol (UDP), and 2G, 3G, or 4G communication protocols.

Figure 2:
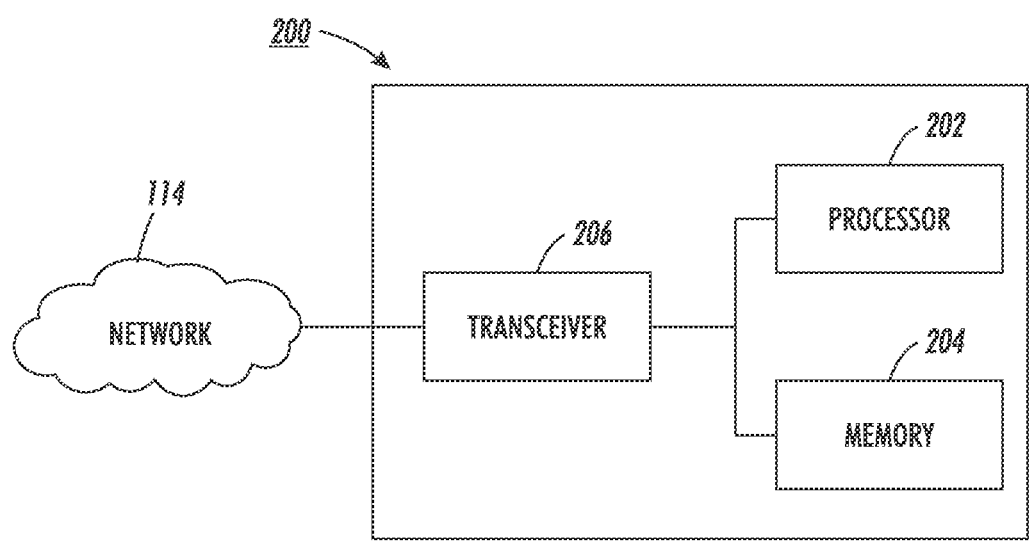
FIG. 2 is a block diagram that illustrates a system for crowdsourcing a task, in accordance with at least one embodiment.

FIG. 2 is a block diagram that illustrates a system 200 for crowdsourcing a task, in accordance with at least one embodiment. In an embodiment, the system 200 may correspond to the crowdsourcing platform server 102, the application server 106, or the requestor-computing device 108. For the purpose of ongoing description, the system 200 is considered as the application server 106. However, the scope of the disclosure should not be limited to the system 200 as the application server 106. The system 200 can also be realized as the crowdsourcing platform server 102 or the requestor-computing device 108.

The system 200 includes a processor 202, a memory 204, and a transceiver 206. The processor 202 is coupled to the memory 204 and the transceiver 206. The transceiver 206 is connected to the network 114.

The processor 202 includes suitable logic, circuitry, and/or interfaces that are operable to execute one or more instructions stored in the memory 204 to perform predetermined operations. The processor 202 may be implemented using one or more processor technologies known in the art. Examples of the processor 202 include, but are not limited to, an x86 processor, an ARM processor, a Reduced Instruction Set Computing (RISC) processor, an Application-Specific Integrated Circuit (ASIC) processor, a Complex Instruction Set Computing (CISC) processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person with ordinary skills in the art that the one or more instructions stored in the memory 204 enable the hardware of the system 200 to perform the predetermined operations.

The transceiver 206 transmits and receives messages and data to/from various components of the system environment 100 (e.g., the crowdsourcing platform server 102, the requestor-computing device 108, the database server 110, and the crowdworker-computing device 112) over the network 114. Examples of the transceiver 206 may include, but are not limited to, an antenna, an Ethernet port, a USB port, or any other port that can be configured to receive and transmit data. The transceiver 206 transmits and receives data/messages in accordance with the various communication protocols, such as, TCP/IP, UDP, and 2G, 3G, or 4G communication protocols.

Figure 3:
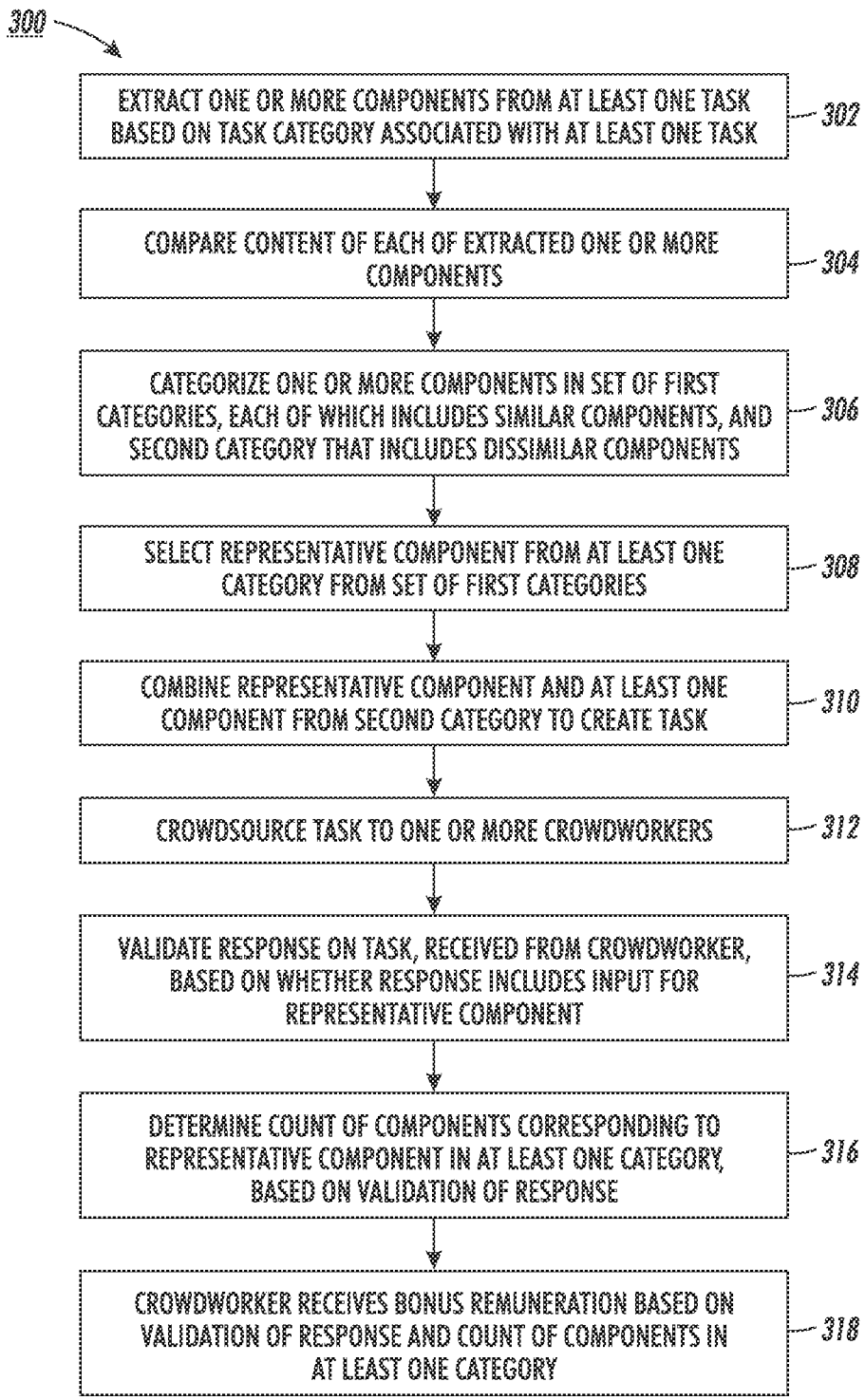
FIG. 3 is a flowchart that illustrates a method for crowdsourcing a task, in accordance with at least one embodiment.
Figure 4:
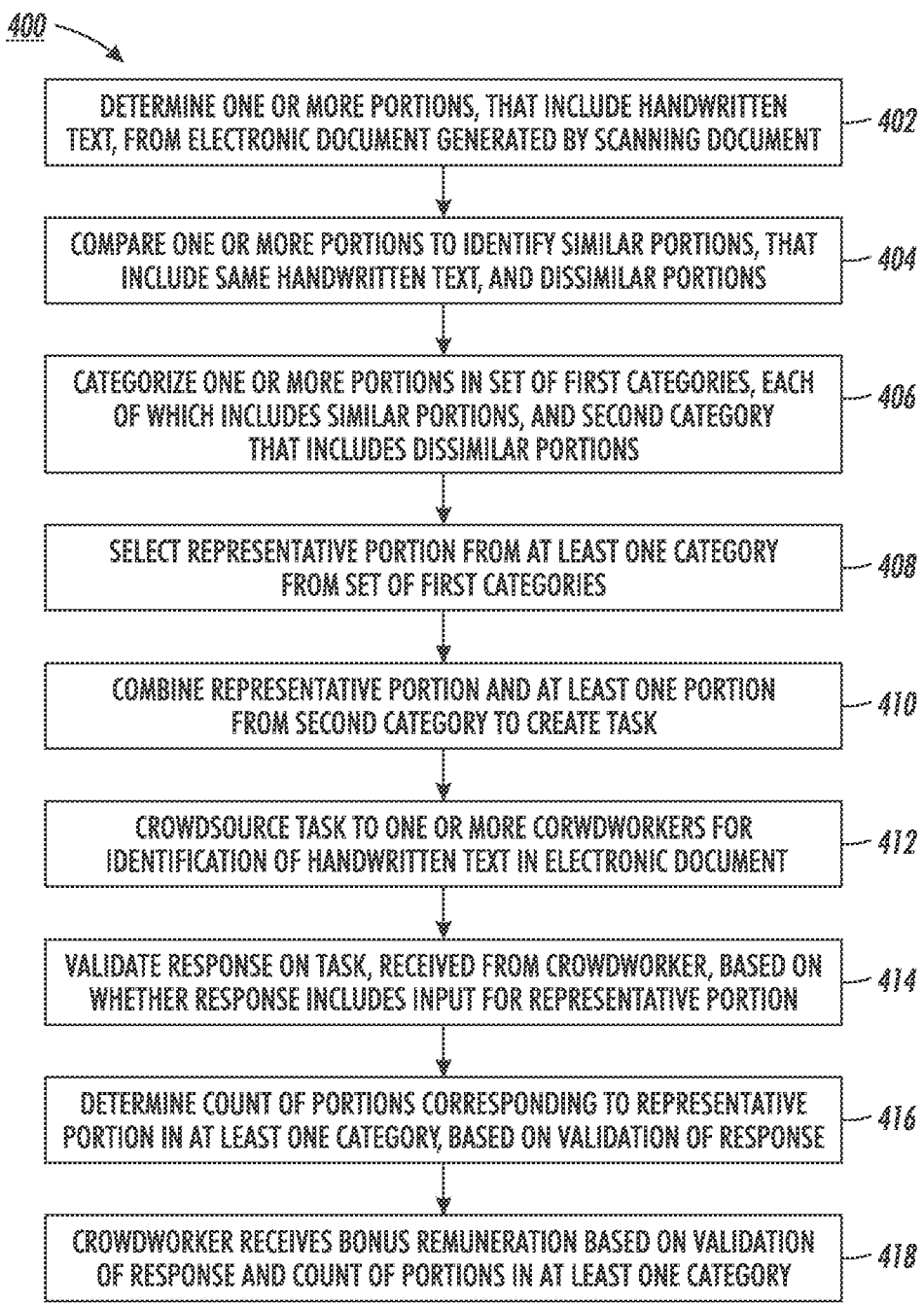
FIG. 4 is a flowchart that illustrates a method for digitizing a document, in accordance with at least one embodiment.

The operation of the system 200 for crowdsourcing a task and for digitizing a document has been described in conjunction with FIG. 3 and FIG. 4, respectively.

FIG. 3 is a flowchart 300 illustrating a method for crowdsourcing a task, in accordance with at least one embodiment. The flowchart 300 is described in conjunction with FIG. 1 and FIG. 2.

At step 302, the one or more components are extracted from the at least one task. In an embodiment, the processor 202 is configured to extract the one or more components from the at least one task based on the task category associated with the at least one task. Prior to extracting the one or more components from the at least one task, the processor 202 determines the task category associated with the at least one task. In an embodiment, the task category of the at least one task is received from the requestor along with the at least one task. In an alternate embodiment, the processor 202 may determine the task category of the at least one task by analyzing one or more instructions for performing the at least one task, which are included in the at least one task. For example, if the at least one task contains an instruction "Digitize the following images", the processor 202 determines that the task category of the at least one task as "Image Digitization". Similarly, if the instruction contained in the at least one task is "Tag the following images", the processor 202 determines the task category as "Image Tagging". Examples of the task category include, but are not limited to, image/video/text labelling/tagging/categorization, language translation, data entry, handwriting recognition, product description writing, product review writing, essay writing, address look-up, website look-up, hyperlink testing, survey completion, consumer feedback, identifying/removing vulgar/illegal content, duplicate checking, problem solving, user testing, video/audio transcription, targeted photography (e.g., of product placement), text/image analysis, directory compilation, or information search/retrieval.

In an embodiment, the task category of the at least one task may be determined in a semi-automatic manner. To that end, in an embodiment, the processor 202 may determine an initial task category for the at least one task by analyzing the one or more instructions of performing the at least one task, as described above. Thereafter, the processor 202 may send a notification to the requestor indicative of the initial task category assigned to the at least one task. The requestor may validate the initial task category as the correct task category for the at least one task. Alternatively, the requestor may provide another suitable task category for the at least one task. Based on such input received from the requestor, the processor 202 may assign a final task category to the at least one task.

In an alternate embodiment, a relevant task category for the at least one task may be provided by the requestor when the requestor submits the at least one task to the application server 106. In such a scenario, the processor 202 may not determine the task category for the at least one task, as the task category associated with the at least one task corresponds to the relevant task category provided by the requestor.

Post determining the task category of the at least one task, the processor 202 identifies smallest units (the term 'component' is hereinafter interchangeably referred as a 'unit', a 'part', or a 'portion') of the at least one task based on the determined task category of the task. The smallest unit may be indivisible in a sense that each such unit may require a distinct input from a crowdworker such as, but not limited to, a single selection (e.g., a mouse-click on a check-box), a single character (e.g., an alpha-numeral), a single word, a single phrase, or a single sentence. For example, an image digitalization task includes one or more images extracted from an electronic document, for instance, a form containing multiple fields that need to be digitized (such a task is also known as a form digitization task). The content of each such field of the form may include multiple characters, multiple words, multiple phrases, or multiple sentences, depending on the type of the field. For example, content of a 'name' field in the form may contain one or more words corresponding to a first name, a middle name, and a last name of a person. Therefore, the smallest units corresponding to the 'name' field may include the first name, the middle name, and the last name portions of the 'name' field. Similarly, content of an 'address' field in the form may contain one or more phrases corresponding to a street address, a city, a state, a zip code, and a country. Along similar lines, the smallest units corresponding to the 'address' field may include the street address, the city, the state, the zip code, and the country portions of the 'address' field.

Further, the type of the distinct input required on the smallest unit may be based on the task category of the at least one task. For example, if the task category of the at least one task is "image tagging", the smallest unit of the at least one task may be an individual image that needs to be tagged by the crowdworker, while the distinct input required from the crowdworker on this smallest unit (i.e., the individual image) may be a single phrase that describes the image.

In a scenario where the task category of the at least one task is determined in the semi-automatic manner, the smallest units may also be identified semi-automatically. In an embodiment, the processor 202 identify an initial set of smallest units of the at least one task based on the initial task category associated with the at least one task. In this case, the notification sent to the requestor may be indicative of the initial task category as well as the initial set of smallest units. Thereafter, the requestor may validate the initial task category as the correct task category. Further, the requestor may also validate the initial set of smallest units as appropriate smallest units of the at least one task. Alternatively, the requestor may indicate one or more samples (examples) or the entire set of smallest units of the at least one task. In another scenario, the requestor may provide a suitable task category for the at least one task. Further, the requestor may indicate one or more samples (examples) or the entire set of the smallest units of the at least one task. In an embodiment, the processor 202 may determine a final set of smallest units of the at least one task based on such input received from the requestor.

Post identifying the smallest units of the at least one task, the processor 202 extracts the one or more components from the at least one task based on the identified smallest units. Each such extracted component may correspond to one smallest unit. Referring to the above example of the form digitization task, each extracted component may correspond to each sub-field within the fields of the form. The 'first name' sub-field, the 'middle name' sub-field, and the 'last name' sub-field are examples of the extracted components corresponding to the 'name' field of the form.

A person skilled in the art would understand that the scope of the disclosure should not be limited to the extraction of the one or more components from the at least one task, as described above. The one or more components may be extracted from the at least one task in various other ways without departing from the spirit of the disclosure.

At step 304, the contents of each of the extracted one or more components are compared with each other. In an embodiment, the processor 202 is configured to compare the contents of the one or more components with each other. In an embodiment, the type of comparison technique used by the processor 202 to compare the one or more components depends upon the type of content within each of the one or more components. The type of content of the one or more components in-turn may depend upon the task category of the at least one task. For example, for a form digitization task, the processor 202 may use a pattern matching based image comparison technique to compare images corresponding to each sub-field of the form (as each extracted component of the form digitization task may correspond to each sub-field within the fields of the form). Similarly, for an image tagging task, the processor 202 may again use a image pattern matching such as SIFT (Scale-Invariant Feature Transform) based image comparison technique to compare each individual image with the other images in the image tagging task (as each extracted component of the image tagging task may correspond to each individual image in the image tagging task). Further, for a language translation task, each extracted component of the task may correspond to each individual word, phrase, or sentence that needs to be translated from a first language to a second language by the crowdworker. To compare the contents of the extracted components of the language translation task, the processor 202 may determine a similarity between pairs of words (or phrases or sentences, as the case may be), where each such word (or phrase or sentence) corresponds to an extracted component of the task. Further, to determine the similarity between the pairs of words (or phrases or sentences), the processor 202 may use a textual pattern matching technique such as, but not limited to, a Hamming distance based comparison, a Levenshtein distance based comparison, or any other text pattern matching technique known in the art.

A person skilled in the art would understand that the scope of the disclosure should not be limited to the comparison between the contents of each of the one or more components, as described above. The contents of the one or more components may be compared with each other based on the task category and using any pattern matching technique known in art.

At step 306, the one or more components are categorized. In an embodiment, the processor 202 is configured to categorize the one or more components in the set of first categories, each of which includes similar components from the one or more components, and the second category that includes dissimilar components from the one or more components. In an embodiment, the categorization of the one or more components is based on the comparison between the contents of the one or more components with each other (as described in step 304), and the task category of the at least one task. For example, a form to be digitized through a form digitization task may include several fields of date type in a standard date format such as MM/DD/YYYY. The processor 202 extracts a "year" (YYYY), a "month" (MM), and a "day" (DD) sub-field from each such date type field. There is a possibility of duplicate values within such sub-fields, i.e., two or more date fields may have the same values in the year, the month, or the day sub-fields. The processor 202 compares the corresponding sub-fields of the fields of date type with each other, for example, the year sub-field of a field of date type is compared to the year sub-fields of the other date fields, and so on. Based on such comparisons, the processor 202 categorizes the sub-fields of the fields of date type into the set of first categories and the second category. Each category within the set of first categories includes similar sub-fields, while the second category includes dissimilar sub-fields. For example, a form includes 6 date fields with the values "Nov. 20, 1998", "Nov. 20, 1998", "Oct. 22, 2000", "Nov. 22, 2000", "Sep. 22, 2000", and "Sep. 22, 2001". In this case, the set of first categories may include 2 categories such as a category-1 and a category-2. As each category in the set of first categories includes similar components, the category-1 may include the similar components such as "Nov. 20, 1998" and "Nov. 20, 1998", while the category-2 may include the similar components such as "Oct. 22, 2000", and "Nov. 22, 2000". Further, the second category (e.g., a category-3) includes the remaining dissimilar components such as "Sep. 22, 2000" and "Sep. 22, 2001".

In an embodiment, the processor 202 may associate a component identification number with each of the one or more components and a category identification number with the second category and each category in the set of first categories. In addition, in an embodiment, the processor 202 may associate a task identification number with the at least one task. The processor 202 may index the task identification number of the at least one task with the component identification number of each component included in the at least one task. Further, the processor 202 may index the category identification number of each category (including the second category and the categories in the set of first categories) with the component identification numbers of the components categorized in the respective category. Such indexing may help in uniquely identifying each component and associating it with the appropriate category (from the second category and the categories in the set of first categories) and the at least one task.

A person skilled in the art would understand that the scope of the disclosure should not be limited to the categorization of the one or more components, as described above. The one or more components may be categorized in various other ways without departing from the spirit of the disclosure.

At step 308, the representative component from at least one category from the first set of categories is selected. In an embodiment, the processor 202 is configured to select the representative component. Since each category within the set of first categories includes similar components, any component can be selected as the representative component from a category. Therefore, the representative component may be selected from the category (within the first set of categories) using any technique such as, but not limited to, a random selection, a first element selection (i.e., the selecting the first component present within the category), a last element selection (i.e., selecting the last component present within the category), or a priority-based selection (i.e., selecting the component that corresponds to a field having a higher priority than the fields corresponding to the other components present within the category).

At step 310, the representative component and at least one component from the second category are combined to create the task. In an embodiment, the processor 202 is configured to create the task by combining the representative component (which is selected at step 308) with the at least one component from the second category. To that end, prior to creating the task, the processor 202 randomly selects the at least one component from the second category.

As explained in step 308, any component may be selected as the representative component from the at least one category (within the first set of categories), as each category from the first set of categories includes similar components. However, as the second category includes dissimilar components, using different selection techniques may lead to a selection of a different set of components from the second category. Further, a person skilled in the art would understand that any selection technique may be used to select the at least one component from the second category.

Post selecting the at least one component, the processor 202 combines the representative component and the selected at least one component from the second category to form the task. In an embodiment, the representative component and the selected at least one component may be randomly ordered within the task so created. For example, the processor 202 may randomly permute a total of 'n' components (where 'n' components include the representative component and the at least one component) in n! ways, where n!=n*(n−1)*(n−2)* . . . 2*1. Thus, the ordering of a total of 'n' constituent components (i.e., the representative component and the at least one component) in the task is possible in n! ways. Therefore, the task so formed from the random ordering of the constituent components may have any arbitrary ordering of the constituent components.

At step 312, the task, so created, is crowdsourced to the one or more crowdworkers. In an embodiment, the processor 202 is configured to crowdsource the task (formed at step 308) to the one or more crowdworkers by uploading the task on the crowdsourcing platform (e.g., 104a) through the transceiver 206. The crowdsourcing platform may (i.e., 104a) in-turn send the task to the one or more crowdworkers on their respective crowdworker-computing devices 110. Thereafter, the one or more crowdworkers may attempt the task on their respective crowdworker-computing devices 110. Further, in an embodiment, the processor 202 may receive the responses for the crowdsourced task from the one or more crowdworkers through the crowdsourcing platform (i.e., 104a), via the transceiver 206.

At step 314, the responses received for the task from the one or more crowdworkers are validated. In an embodiment, the processor 202 is configured to validate the received responses based on whether the responses include the input for the representative component. For example, the processor 202 may apply a data validation (such as a regular expression validation) on each response to validate the various inputs included in the response. Further, the processor 202 may determine whether each response includes an input for the representative component. If the processor 202 determines that a particular response does include the input for the representative component, the particular response deemed as valid, and the crowdworker providing the particular response may receive the bonus remuneration. Therefore, the crowdworker may receive the bonus remuneration if the crowdworker provides the input for the representative component within the task (i.e., when the crowdworker attempts the representative component within the task).

Post determining whether the response is valid, the processor 202 may determine the count of the components in the at least one category corresponding to the representative component, as explained further.

At step 316, based on the validation of the response, the count of the components in the at least one category corresponding to the representative component is determined. If the response is determined as valid, in an embodiment, the processor 202 is configured to determine the count of the components in the at least one category corresponding to the representative component. Thus, if at step 314, the processor 202 determines that at least one of the received responses for the crowdsourced task is valid (i.e., at least one of the received responses includes the input for the representative component), the processor 202 may determine the count of the components in the at least one category, which corresponds to the representative component.

As previously discussed in step 306, the processor 202 may assign a component identification number to each component of the at least one task and a category identification number to each category from the second category and the categories in the set of first categories. Further, the processor 202 may index the component identification number of each component with the category identification number of the category to which the component is categorized. Therefore, the processor 202 may associate each component with the appropriate category, to which the component is categorized, based on the indexing of the component identification numbers with respect to the category identification numbers. The following table illustrates an example of indexing of component identification numbers of components with respect to category identification numbers of corresponding categories.

TABLE 1

An example indexing of component identification numbers of components with respect to category identification numbers of corresponding categories.

| Category | Category Identification Number | Component | Component Identification Number |
|---|---|---|---|
| Category-1 | C1 | Component-1 | P1 |
|  |  | Component-2 | P2 |
|  |  | Component-3 | P3 |
| Category-2 | C2 | Component-4 | P4 |
|  |  | Component-5 | P5 |

Referring to the above table, it is evident that category-1 includes three components, i.e., component-1, component-2, and component-3. Further, category-2 includes two components, i.e., component-4 and component-5. As shown in Table 1, the processor 202 assigns the category identification number C1 to categoryy-1 and the category identification number C2 to category-2. Further, the processor 202 assigns the component identification numbers P1, P2, P3, P4, and P5 to the various components such as component-1, component-2, component-3, component-4, and component-5, respectively. The component identification number may be indexed based on the category identification number. C1→P1, C1→P2, C1→P3, C2→P4, and C2→P5 are example representations of the indexing of the component identification numbers to the category identification numbers.

In an embodiment, the processor 202 may use the indexing of the component identification numbers with respect to the category identification numbers of the corresponding categories to identify the category to which a particular component belongs. Further, the processor 202 may also use such indexing to identify the components that belong to a particular category. Hence, to determine the count of components in the at least one category, the processor 202 may first identify the at least one category based on the component identification number of the representative component and the category identification number of the at least one category. Thereafter, the processor 202 may identify the components belonging to the at least one category based on the indexing and thereby determine the count of such components.

Referring to the example illustrated in Table 1, consider the representative component as component-2. The component identification number of component-2 is C1→P2. Therefore, the processor 202 identifies the category corresponding to component-2 as category-1 with the category identification number as C1. Further, the processor 202 identifies that category-1 includes three components with the component identification numbers C1→P1, C1→P2, and C1→P3. Hence, in this case, the count of components included in the at least one category (i.e., category-1) is determined as 3.

At step 318, the one or more crowdworkers receive the bonus remuneration based on the validation of the responses and the count of the components in the at least one category.

In an embodiment, the processor 202 is configured to credit the one or more crowdworkers with the bonus remuneration based on the validation of the responses received from the one or more crowdworkers (as explained in step 314) and the determination of the count of components in the at least one category (as explained in step 316). To that end, in an embodiment, the processor 202 may notify the crowdsourcing platform (e.g., 104*a*) to credit the bonus remuneration to each crowdworker who provided the input for the representative component. Further, in an embodiment, the bonus remuneration may depend upon the count of components in the at least one category, which is the category associated with the representative component. For example, if the count of components in the at least one category is 3, the bonus remuneration credited to the one or more crowdworkers may be 30 cents, whereas if the count of components is 5, the bonus remuneration may be 50 cents, and so on.

As previously discussed in step 310, the task includes randomly ordered constituent components (including the representative component and the at least one component from the second category). Hence, the one or more crowdworkers may not know whether a particular component is the representative component or not. Further, the bonus remuneration may depend on the count of components in the at least one category. As the one or more crowdworkers are not aware about the categorization of the components, they may not be able to predict the bonus remuneration receivable on successful attempt of the representative component. Such randomness in the ordering of the constituent components of the task and the bonus remuneration receivable for the successful attempt of the representative component may gamify the experience of attempting the task for the one or more crowdworkers. Such gamification may provide an intrinsic motivation to the crowdworkers for attempting the task, even though the task in itself may be monotonous and uninteresting, such as a form digitization task.

Further, in an embodiment, the processor 202 may provide a leader-board with live feeds to the one or more crowdworkers through the crowdsourcing platform (e.g., 104*a*). The leader-board may provide a comparative ranking of the one or more crowdworkers with respect to the number of tasks attempted by the one or more crowdworkers and the amount of bonus remuneration received by the one or more crowdworkers. For example, the crowdworkers may be assigned points based on the number of tasks attempted and the amount of bonus remuneration received. The leader-board may enlist the top ten crowdworkers based on the points assigned to the crowdworkers. Further, each crowdworker may be provided a comparative rank on the leader-board based on the points assigned to the crowdworker. In addition, the live feeds may notify a crowdworker about the other crowdworkers working on similar types of tasks, and also about the bonus remuneration received by the other crowdworkers on the similar types of tasks. For example, the live feeds notify a crowdworker A working on a form digitization task about crowdworkers B, C, and D who are working on (or who worker on) other form digitization tasks. Further, the bonus remuneration received by the crowdworkers B, C, and D on such form digitization tasks may also be included in the live feeds posted to the crowdworker A. Such leader-board and the live feeds may further provide intrinsic motivation to the crowdworkers for attempting the task.

FIG. 4 is a flowchart 400 that illustrates a method for digitizing a document, in accordance with at least one embodiment. The flowchart 400 is described in conjunction with FIG. 1, FIG. 2, and FIG. 5.

Figure 5:
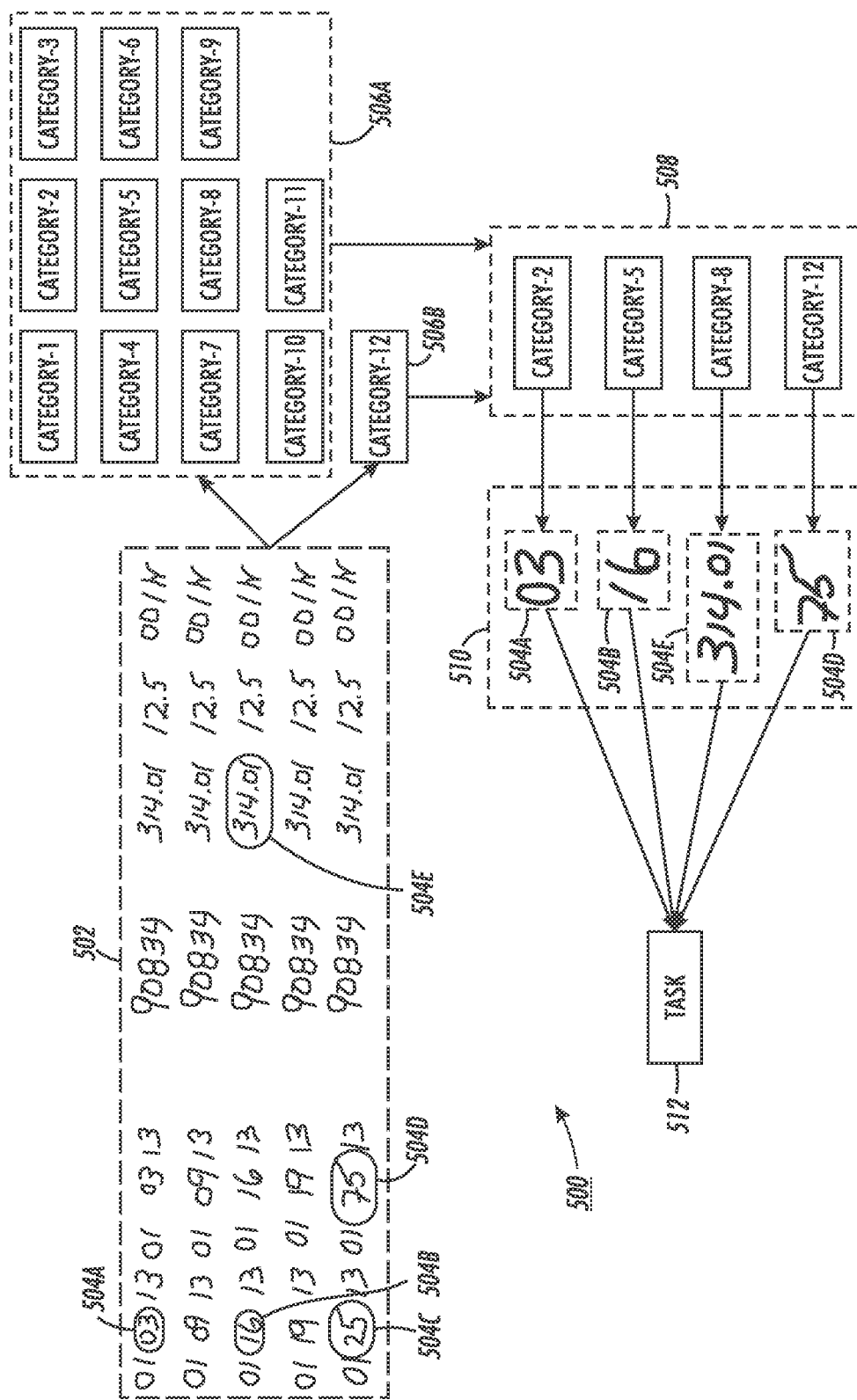
FIG. 5 is a flow diagram illustrating an example of digitization of a document, in accordance with at least one embodiment.

FIG. 5 is a flow diagram 500 illustrating an example of digitization of a document 502, in accordance with at least one embodiment.

Referring to FIG. 4, at step 402, one or more portions that include handwritten text are determined from an electronic document, which is generated by scanning a document. In an embodiment, the processor 202 is configured to determine the one or more portions containing handwritten text from the electronic document. The electronic document may be generated by scanning the document using a scanner/multi-function device. In an embodiment, the scanner/multi-function device may be integrated within the requestor-computing device 108. In an alternate embodiment, the scanner/multi-function device may be a separate device that is communicatively coupled to the requestor-computing device 108. Further, in an embodiment, the processor 202 may receive this electronic document from the requestor-computing device 108 or directly from the scanner/multi-function device, through the transceiver 206.

In response to receiving the electronic document, the processor 202 may determine the one or more portions from the electronic document, which contain handwritten text. The one or more portions containing handwritten text may be identified using one or more image processing techniques such as, but not limited to, Optical Character Recognition (OCR), Intelligent Character Recognition (ICR), image segmentation, image feature extraction, or any other image processing technique, and/or one or more machine learning techniques such as, but not limited to, neural networks, fuzzy logic, Support Vector Machine (SVM), Naïve Bayes Classifiers, k-means clustering, or any other machine learning technique.

For example, referring to FIG. 5, the processor 202 may determine the one or more portions containing handwritten text from the electronic document 502. For instance, the handwritten numerals "03" (denoted by 504*a*), "16" (denoted by 504*b*), "25" (denoted by 504*c*), "75" (denoted by 504*d*), and "314.01" (denoted by 504*e*) are some of the portions containing handwritten text that may be identified by the processor 202 from the electronic document 502.

Referring to FIG. 4, at step 404, the one or more portions are compared to identify similar portions and dissimilar portions. In an embodiment, the processor 202 is configured to compare the one or more portions, determined at step 402, to identify similar portions that include the same handwritten text and dissimilar portions. In an embodiment, the processor 202 may use one or more pattern matching techniques such as, but not limited to, Hidden Markov Models (HMMs), neural networks, fuzzy logic, SVM, Naïve Bayes Classifiers, k-means clustering, or any other pattern matching technique. For instance, referring to FIG. 5, the processor 202 may identify 5 similar portions containing the handwritten text "314.01" (denoted by 504*e*) in the five rows of the handwritten text included in the electronic document 502. Further, the processor 202 may identify the dissimilar portions in the electronic document 502 as the portions with the handwritten text "25" (denoted by 504*c*) and "75" (denoted by 504*d*).

Referring to FIG. 4, at step 406, the one or more portions are categorized in the set of first categories, each of which includes the similar portions from the one or more portions, and the second category that includes the dissimilar portions from the one or more portions. In an embodiment, the processor 202 is configured to categorize the one or more portions in the set of first categories and the second category. For example, referring to FIG. 5, the processor 202 categories the one or more portions (i.e., 55 portions) determined from the electronic document 502 into a set of first categories 506a and a second category 506b. In this example, the first set of categories 506a includes eleven categories (category-1, category-2, category-3 . . . category-11), each of which includes similar portions from the one or more portions. For instance, the category-2 may include two portions, each of which includes the similar handwritten text "03" (denoted by 504a). Further, the second category 506b includes a category-12 that contains two dissimilar portions with the handwritten text "25" (denoted by 504c) and "75" (denoted by 504d). The following table illustrates an example of the handwritten text within the portions included in the various categories (category-1, category-2, category-3 . . . category-12) and the number of such portions included in these categories.

TABLE 2

An example of the handwritten text within the portions included in the various categories, and the number of such portions in these categories.

| Category | Handwritten text within constituent portions | Number of portions |
| --- | --- | --- |
| Category-1 | "01" | 10 |
| Category-2 | "03" | 2 |
| Category-3 | "13" | 10 |
| Category-4 | "09" | 2 |
| Category-5 | "16" | 2 |
| Category-6 | "19" | 2 |
| Category-7 | "90834" | 5 |
| Category-8 | "314.01" | 5 |
| Category-9 | "125" | 5 |
| Category-10 | "00" | 5 |
| Category-11 | "1 hr" | 5 |
| Category-12 | "25" | 1 |
|  | "75" | 1 |

Referring to FIG. 4, at step 408, the representative portion is selected from the at least one category from the set of first categories. In an embodiment, the processor 202 is configured to select the representative portion from the at least one category from the set of first categories. To that end, the processor 202 may first select the at least one category from the set of first categories. For instance, referring to FIG. 5, the selection of the at least one category from the set of first categories 506a is denoted by 508. As is evident from 508, the categories such as category-2, category-5, and category-8 may be selected from the set of first categories 506a. Further, the second category (i.e., the category-12, denoted by 506b) is also included in the selected set of categories 508. In an embodiment, the processor 202 may select the at least one category from the set of first categories using any selection technique such as, a random selection, a priority-based selection (i.e., selecting the categories that include portions having a higher priority than the portions included in the other categories, or selecting the categories having portions that could not be properly digitized using an OCR software), or any other selection technique.

Post selecting the at least one category from the set of first categories, the processor 202 may select the representative portion from each of the at least one category selected from the set of first categories. Further, the processor 202 may also select at least one portion from the second category. For instance, referring to FIG. 5, the processor 202 may select the representative portions 504a, 504b, and 504e (with the handwritten text "03", "16", and "314.01" respectively) from the selected at least one category (including categories such as category-2, category-5, and category-8, respectively). Further, the processor 202 may select the portion 504d (with the handwritten text "75") from the second category, i.e., category-12. The selection of the representative portions from the at least one category (i.e., category-2, category-5, and category-8) and the at least one portion from the second category (i.e., category-12) has been depicted by 510.

Referring to FIG. 4, at step 410, the representative portion from the at least one category and the at least one portion from the second category are combined to create the task. In an embodiment, the processor 202 is configured to create the task by combining the representative portion with the at least one portion. In an embodiment, the processor 202 may combine the representative portion and the at least one portion in a random manner such that the constituent portions within the created task are arranged in a random order. For example, referring to FIG. 5, the processor 202 may combine the selected portions denoted by 510 (which include the representative portions (i.e., the portions 504a, 504b, and 504e) from the at least one category (i.e., category-2, category-5, and category-8, respectively), and the at least one portion (i.e., the portion 504d) from the second category (i.e., category-12) to create the task 512. Since the number of constituent portions in the task 512 is 4, there are 4! (i.e., 24) possible arrangements of the constituent portions within the task 512. Accordingly, the processor 202 may randomly permute the constituent portions 504a, 504b, 504e, and 504d in any one of the 24 possible arrangements of such constituent portions.

Referring to FIG. 4, at step 412, the task is crowdsourced to the one or more crowdworkers for identification of the handwritten text within the electronic document. In an embodiment, the processor 202 is configured to crowdsource the task to the one or more crowdworkers by uploading the task on the crowdsourcing platform (e.g., 104a) through the transceiver 206. The crowdsourcing platform (i.e., 104a) may in-turn send the task to the one or more crowdworkers on their respective crowdworker-computing devices 110. Thereafter, the one or more crowdworkers may attempt the task on their respective crowdworker-computing devices 110. Further, in an embodiment, the processor 202 may receive the responses for the crowdsourced task from the one or more crowdworkers through the crowdsourcing platform (i.e., 104a), via the transceiver 206.

At step 414, the responses received for the task from the one or more crowdworkers are validated. In an embodiment, the processor 202 is configured to validate the received responses based on whether the responses include an input for the representative portion. For instance, referring to FIG. 5, the processor 202 may flag a received response as a valid response if the response includes inputs for the representative portions within the task 512, i.e., if the crowdworker provided inputs for the portions 504a, 504b, and 504e.

Referring to FIG. 4, at step 416, the count of portions corresponding to the representative portion in the at least one category is determined, based on the validation of the responses. In an embodiment, the processor 202 is configured to determine the count of portions within the at least one category to which the representative portion belongs, if there is at least one valid response in the set of received responses, which has the input for such representative portion. For instance, referring to FIG. 5 and Table 2, the processor 202 may determine the count of portions within the at least one category that includes categories such as category-2, category-5, and category-8 as 2, 2, and 5, respectively.

Referring to FIG. 4, at step 418, the one or more crowdworkers receive the bonus remuneration based on the validation of the responses and the count of the portions in the at least one category. In an embodiment, the processor 202 is configured to credit the one or more crowdworkers with the bonus remuneration based on the validation of the responses received from the one or more crowdworkers (as explained in step 414) and the determination of the count of portions in the at least one category (as explained in step 416). To that end, in an embodiment, the processor 202 may notify the crowdsourcing platform (i.e., 104a) to credit the bonus remuneration to each crowdworker who provided the input for the representative portion. Further, in an embodiment, the bonus remuneration may depend upon the count of portions in the at least one category, which is the category associated with the representative portion. For example, if a crowdworker provides the input for the representative portion 504a (belonging to category-2 that includes two similar portions) or the representative portion 504b (belonging to category-5 that includes two similar portions), the crowdworker may receive the bonus remuneration of 20 cents. However, if the crowdworker provides the input for the representative portion 504e (belonging to category-8 that includes five similar portions), the crowdworker may receive the bonus remuneration of 50 cents.

A person skilled in the art would understand that the scope of the disclosure should not be limited to the digitization of the document through crowdsourcing, as described above. The disclosure may be implemented for crowdsourcing of any type of task. Further, the examples used in the disclosure are for illustrative purposes only, and should not be construed to limit the scope of the disclosure.

The disclosed embodiments encompass numerous advantages. Various embodiments of the disclosure gamify the experience of attempting crowdsourced tasks for the crowdworkers. Since, the task includes randomly ordered constituent components (including the representative component and the at least one component from the second category), the one or more crowdworkers may not know whether a particular component is the representative component or not. Further, the bonus remuneration may depend on the count of components in the at least one category. As the one or more crowdworkers are not aware about the categorization of the components, they may not be able to predict the bonus remuneration receivable on successful attempt of the representative component. Such randomness in the ordering of the constituent components of the task and the bonus remuneration receivable for the successful attempt of the representative component may gamify the experience of attempting the task for the one or more crowdworkers. Further, the leader-board and the live feeds, as described in step 318, may provide a competitive spirit to the crowdworkers and encourage them to perform better. Therefore, such aspects of gamification may provide an intrinsic motivation to the crowdworkers for attempting the task, even though the task in itself may be monotonous and uninteresting, such as a form digitization task.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for crowdsourcing a task have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for digitizing a document, the method comprising:
    determining, by one or more processors, one or more portions comprising at least a handwritten text, from an electronic document, wherein the electronic document is generated by scanning the document;
    comparing, by the one or more processors, each portion of the one or more portions with remaining portions of the one or more portions to identify similar portions, and/or dissimilar portions, wherein the similar portions include at least the same handwritten text;
    categorizing, by the one or more processors, the one or more portions in a set of first categories and a second category, wherein each category in the set of first categories includes the similar portions, and wherein the second category includes the dissimilar portions; and
    combining, by the one or more processors, a representative portion from at least one category from the set of first categories, and at least one portion from the second category to create a task, wherein the task is crowdsourced to one or more crowdworkers for identification of the handwritten text in the electronic document.

2. The method of claim 1 further comprising validating, by the one or more processors, a response received from the crowdworker on the task.

3. The method of claim 2, wherein validating further comprises determining, by the one or more processors, whether the response includes the input for the representative portion.

4. The method of claim 3 further comprising determining, by the one or more processors, a count of portions, corresponding to the representative portion, in the at least one category, based on the determination whether the response includes the input for the representative portion.

5. The method of claim 4, wherein the crowdworker receives a bonus remuneration based on the validation of the response and the count of the portions in the at least one category.

* * * * *